United States Patent [19]
Kobetz

[11] 3,887,691
[45] June 3, 1975

[54] CHEMICAL PROCESS
[75] Inventor: Paul Kobetz, Baton Rouge, La.
[73] Assignee: Ethyl Corporation, Richmond, Va.
[22] Filed: July 17, 1972
[21] Appl. No.: 272,314

[52] U.S. Cl. ................ 423/462; 423/626; 423/630; 423/629; 423/481; 424/68; 260/632
[51] Int. Cl. ........................... C01b 7/00; C01f 7/02
[58] Field of Search ........... 423/626, 629, 630, 592, 423/462; 260/632 A

[56] References Cited
UNITED STATES PATENTS
2,249,761   7/1941   Hixson et al. .................... 423/626
3,042,696   7/1962   Aldridge ........................... 423/630

OTHER PUBLICATIONS
Jacobson: "Encyclopedia of Chemical Reactons," Vol. 1, (1946), p. 73.
Tanabe: "Basic Aluminum Compounds," American Perfumes and Cosmetics, Vol. 77, August 1962.

Primary Examiner—Herbert T. Carter
Attorney, Agent, or Firm—Donald L. Johnson; John F. Sieberth; Shelton B. McAnelly

[57] ABSTRACT

Aluminum alkoxides are hydrolyzed with hydrochloric acid in an aqueous system in proportions of from about one-half to about one mol of hydrochloric acid per mol of aluminum alkoxide to produce a plural phase system of co-product alcohols and a water-soluble hydroxy chloroaluminum compound. The plural phase system is readily separated into components. The hydroxy chloroaluminum compound is pyrolyzed to yield aluminum hydroxide or aluminum oxide plus hydrochloric acid.

13 Claims, No Drawings

CHEMICAL PROCESS

BACKGROUND OF THE INVENTION

1. Field of the Invention

The invention relates to the preparation of hydroxy chloroaluminum compounds and aluminum oxides and hydroxides and alcohols.

2. Description of the Prior Art

The hydrolysis of aluminum alkoxides is a process well known in the art. It is described in U.S. Pat. Nos. 3,475,501; 3,475,476; 3,384,651; 3,415,861; 2,892,858 and 2,823,144 and in British Pat. Nos. 967,053 and 935,802, these patents and the art cited therein being incorporated herein by reference.

As a practical matter, a preferred method to achieve rapid and complete hydrolysis of aluminum alkoxides to produce alcohols without regard for co-products is to use a stoichiometric amount of moderately concentrated sulfuric acid in an aqueous system. This provided rapid and complete reaction with production of a highly soluble aluminum compound by-product; however, it suffers from the characteristic that the co-product is aluminum sulfate. Where aluminum sulfate is desired, this is no particular problem; however, if some other compound of aluminum is desired, such as those sought herein, this process has the disadvantage that the desired product is not easily obtained.

Where the sulfuric acid is omitted in the prior art hydrolysis just mentioned, the by-product aluminum compound is a gelatinous aluminum hydroxide precipitate which is not easily separated from the alcohol. Furthermore, as a general proposition, the hydrolysis is slower and less complete.

Another form of prior art hydrolysis uses a basic reactant to react with the aluminum released; however, this also suffers from several disadvantages and does not produce a product in the form desired for the present purposes.

Objects

It is an object of the present invention to provide a process for hydrolyzing aluminum alkoxides to produce alcohols and co-product hydroxychloroaluminum.

Another object of the present invention is to provide a process for hydrolyzing aluminum alkoxides to produce alcohols and a co-product aluminum compound of the formula $AlCl_x(OH)_y$ wherein $x$ is from about 0.5 to about 1.0; $y$ is from about 2.0 to about 2.5 and $x + y$ is 3.

Another object of the present invention is to provide a process for hydrolyzing aluminum alkoxides rapidly and in high efficiency to produce (1) alcohols and (2) an intermediate compound which are readily separated; the intermediate compound being readily converted to $Al(OH)_3$ or $Al_2O_3$.

Another object of the present invention is to provide a process for hydrolyzing aluminum alkoxides with hydrochloric acid to produce alcohols and a co-product aluminum compound wherein from about one half to about one mol of acid is used per mol of aluminum alkoxide.

Another object of the present invention is to provide a process for hydrolyzing aluminum alkoxides to produce alcohols and a co-product intermediate aluminum compound from which the acid is readily recovered for reuse or for the production of revenue.

Another object of the present invention is to provide a process for the rapid and substantially complete conversion of aluminum alkoxides into alkanols and a co-product intermediate compound via an acid assisted hydrolysis, the intermediate being readily converted to yield the acid and to produce a valuable product $Al(OH)_3$ or $Al_2O_3$ of high reactivity. Preferred alkanols are characterized by straight chain carbon skeleton structure, saturated carbon to carbon linkage and single hydroxyl group per molecule (monobasic). Preferred alcohol products have little or no impurities, typically 10 mol percent or less such as less than 5 percent or less than 1 percent.

Other and further objects and features of the present invention will become apparent upon a careful consideration of the following written description of the invention. This description is intended to enable any person skilled in the art to make and use the invention.

Although preferred alcohols are alkanols (monobasic), it is evident that polybasic alcohols; e.g., diols can also be produced.

SUMMARY OF THE INVENTION

In accordance with the present process, hydroxy chloroaluminum or aluminum chlorohydrate is produced by reacting an aluminum alkoxide $Al(OR)_3$ with hydrochloric acid (HCl) in an aqueous system in molar proportions of from about ½ to about 1 mol of hydrochloric acid per mol of aluminum alkoxide to form a product system which readily separates into two phases. The reaction is rapid and comlete even at ordinary room temperature, predictably faster at higher temperatures. One of the phases thus obtained is an organic phase containing the alcohol coproducts. The other phase is an aqueous phase containing the hydroxy chloroaluminum compound in solution.

The present invention thus relates to a process for hydrolyzing aluminum alkoxides to produce alcohol and a hydroxy chloroaluminum compound.

In this process, an aluminum alkoxide having from about 6 to about 30 carbon atoms per alkoxide group is reacted with hydrochloric acid in molar proportions of from about ½ to about 1 mol of hydrochloric acid per mol of aluminum alkoxide in an aqueous system to form a two phase reaction product system. One of the phases of the reaction product system is an organic phase. The other of the phases is an aqueous solution of $AlCl_{0.5-1.0}(OH)_{2.5-2.0}$. Following the reaction, the two phases are separated.

The present invention also relates to an improved method for producing aluminum oxide or aluminum hydroxide. In this process an aluminum alkoxide having from about 6 to about 30 carbon atoms per alkoxide group is reacted with hydrochloric acid in molar proportions of from about ½ to about 1 mol of hydrochloric acid per mol of aluminum alkoxide in an aqueous system to form a two phase reaction product system. One of the phases of the reaction product system is an organic phase. The other of the phases is an aqueous solution of $AlCl_{0.5-1.0}(OH)_{2.5-2.0}$. Following the reaction, the phases are separated and water and hydrochloric acid are vaporized from the $AlCl_{0.5-1.0}(OH)_{2.5-2.0}$ to produce a residue of aluminum hydroxide or aluminum oxide.

In a preferred aspect, the aluminum alkoxide reacted in accordance with the present invention contains a plurality of alkyl groups ranging from about ethyl to about triacontyl, predominating in decyl, dodecyl, tetradecyl and hexadecyl alkyl groups.

In a preferred aspect, the aluminum alkoxide reacted in accordance with the present invention contains predominantly octyl and higher alkyl groups.

The process of claim 1 wherein the aluminum alkoxide is predominantly one or more of tridodecoxy aluminum, tritetradecoxy aluminum and trihexadecoxy aluminum.

In a preferred aspect of the present invention, the molar ratio of hydrochloric acid to aluminum alkoxide is about ½:1 and the product is $AlCl_{0.5}(OH)_{2.5}$.

In a preferred aspect of the present invention, the temperature of the reaction of aluminum alkoxide and HCl is from about 0° to about 150°C; more preferably from about 40° to about 80°C.

In a preferred aspect of the present invention, substantially anhydrous aluminum alkoxide is combined with an HCl solution of from about 1 to about 38 weight percent HCl.

In a preferred aspect, hydrochloric acid vaporized from the water phase of $AlCl_{0.5-1.0}(OH)_{2.5-2.0}$ is recovered and recycled to the step of reaction of the aluminum alkoxide.

In a preferred aspect at least a portion of the heating of the $AlCl_{0.5-1.0}(OH)_{2.5-2.0}$ to produce aluminum hydroxide or aluminum oxide is at a temperature of from about 150° to about 1500°C, more preferably from about 300° to about 1000°C, particularly from about 450° to about 600°C, typically 500°C.

In a preferred aspect, product alcohols are alkanols having only one hydroxyl group per molecule.

The alcohol produced by the process of the present invention is directly usable in numerous ways, e.g. by sulfation to produce detergents. If desired, the alcohol is subjected to intervening purification, e.g. by the processes of U.S. Pat. No. 3,468,965, the disclosure of which is herein incorporated by reference.

The aqueous phase is readily treated to remove excess water, residual reactants, etc. to produce hydroxy chloroaluminum useful for anti-perspirant and deodorant compounds. For such usage, the aqueous phase remaining after hydrolysis on separation of the alcohol is evaporated to dryness at a temperature of from about 50 to about 150°C to remove free water yielding a product $Al(OH)_{2.5}Cl_{0.5} \cdot H_2O$. It will be noted that this contains one molecule of water of hydration. In addition, the hydroxy chloroaluminum is readily pyrolyzed to yield aluminum oxide or aluminum hydroxide for use as a catalyst, adsorbent, absorbent, etc. Hydrochloric acid obtained from the hydrolysis is conveniently recycled to the hydrolysis or used in other ways or sold.

Discussion

The present invention is characterized by several important aspects. In the first place the desired hydrolysis reaction is rapid and complete when performed as described herein and the desired product alcohols are readily recovered from the desired aqueous by-product phase. This desired situation is attained with especial attention given to certain details.

In the first place, the aluminum alkoxides used preferably have alkoxy groups (RO) whose corresponding alcohols ROH, or at least the bulk of them, are substantially insoluble in water. In general, this means alkoxides having alkoxy groups with six or more carbon atoms each or which at least predominate in such. In addition, good separation of the alcohol and water phases from hydrolysis and rapid and complete hydrolysis require the product alcohols to be in the liquid phase. Since most alcohols having 20 to 30 and more carbon atoms per molecule have rather high melting points, temperature has a part in setting the preferred conditions for the hydrolysis reaction and for the separation and purification of the hydrolysis products. Thus, although the reaction and separation can be obtained with various materials at any temperature from the solidification point of the aqueous phase (e.g. 0° to −30°C), and up to the decomposition point of product alcohols (e.g. from 0° up to about 300°C), one prefers to use temperatures near ambient or only slightly elevated with respect thereto to facilitate operation with cooling tower water for cooling purposes on warm days. Thus, the reaction is usually conducted at a temperature of from about 0°–100°C in ordinary nonpressure vessels, or at higher temperatures of up to about 150°C particularly if under autogenous pressures or higher with a preferred narrower range being from about 40° to about 80°C.

The pressure of the reaction and separation are not unpredictably critical and any pressure from atmospheric to autogenous for the temperature selected, or autogenous to elevated of up to about 500 psig or down to about 0.1 atmosphere is generally suitable. In general, it is preferred to operate at about atmospheric or about autogenous pressure to avoid unnecessary complications and costs of operating at sub- or super-atmospheric pressures. A narrower range of pressure is from about ½ to about 5 atmospheres.

Another important aspect of the present process is the stoichiometry, particularly the ratio of aluminum alkoxide to hydrochloric acid. It has been found that the minimum amount of hydrochloric acid to produce a water soluble intermediate hydroxy chloroaluminum compound is about ½ mol of HCl per mol of aluminum alkoxide $Al(OR)_3$ reacted. Likewise it has been found that the maximum desired amount of HCl is about one mol of HCl per mol of aluminum alkoxide reacted. Greater amounts are unnecessary to achieve a water soluble intermediate and hence involve unnecessary cost and handling expenses. In general, it is preferred to use near the minimum amount of acid therefore a preferred ratio of acid to aluminum alkoxide is from about ½ to about 3/4 moles per mol.

The hydrolysis reaction is rapid and may be conducted in time periods of from a few seconds to several hours depending upon the temperature and the concentration of the system. Preferred reaction times are from about 5 to about 10 minutes at the preferred reaction temperatures of 40° to 80°C.

The hydrolysis reaction is performed in an aqueous system usually by combining an anhydrous aluminum alkoxide with an aqueous solution of hydrochloric acid. Although the hydrochloric acid solution may range from dilute to concentrated, it is generally preferred to use from about a 1 to about a 38 weight percent HCl solution. A more preferred solution, particularly in combination with operation at the preferred temperatures of from 40° to 80°C, is from about 5 to about 20 weight percent HCl with about 10 wt. percent HCl typical.

The pyrolysis reaction may be conducted at any suitable temperature in any suitable apparatus such as a rotary kiln or an oven capable of withstanding the corrosive fumes of HCl liberated. In general, pyrolysis temperatures of from about 150° to about 1500°C are suitable, with temperatures of from about 450° to about 600°C being preferred.

The reaction of aluminum alkoxides with hydrochloric acid in aqueous solution in accordance with the present invention occurs in several steps progressively and concurrently.

The following reactions are typical.
1. $Al(OR)_3 + 3 H_2O \rightarrow Al(OH)_3 + 3 ROH$
2. $Al(OR)_3 + 3 HCl \rightarrow AlCl_3 + 3 ROH$
3. $Al(OR)_3 + 2 HCl + H_2O \rightarrow Al(OH)Cl_2 + 3 ROH$
4. $Al(OR)_3 + HCl + 2 H_2O \rightarrow Al(OH)_2Cl + 3 ROH$
5. $Al(OR)_3 + \frac{1}{2} HCl + 2\text{-}\frac{1}{2} H_2O \rightarrow Al(OH)_{2.5}Cl_{0.5} + 3 ROH$
6. $Al(OH)_3 + 3 HCl \rightarrow AlCl_3 + 3 H_2O$
7. $Al(OH)_3 + 2 HCl \rightarrow AlCl_2OH + 2 H_2O$
8. $Al(OH)_3 + HCl \rightarrow Al(OH)_2Cl + H_2O$
9. $Al(OH)_3 + \frac{1}{2} HCl \rightarrow Al(OH)_{2.5}Cl_{0.5} + \frac{1}{2} H_2O$
10. $AlCl_3 + 2 Al(OH)_3 \rightarrow 3 Al(OH)_2Cl$
11. $AlCl_2OH + Al(OH)_3 \rightarrow 2 Al(OH)_2Cl$
12. $AlCl(OH)_2 + Al(OH)_3 \rightarrow 2 Al(OH)_{2.5}Cl_{0.5}$ The following is an overall reaction
13. $Al(OR)_3 + xHCl + yH_2O \rightarrow Al(OH)_yCl_x + 3 ROH$
where:
$x = 0.5\text{-}1$
$y = 2\text{-}2.5$
$x+y = 3$ Apparently the first predominant reaction is (1) to form a highly reactive gelatinous aluminum hydroxide precipitate which is not easily separated from the co-product alcohol.

The aluminum hydroxide gel or the mixture thereof with alcohol reacts with HCl or the aluminum-chloro compounds at a temperature of from about 0° to about 100°C in a time of from about 1 minute to about 2 hours to give a two-phase system. The top phase contains the alcohol and the lower phase contains the aluminum hydroxy chlorides of equation 13. The two phases are separated by conventional means, such as decantation or centrifuging.

The alkyl groups in the aluminum alkoxides used for the reaction are not particularly critical as long as the product alcohols desired remain in a phase separate from the water phase and adverse reactivity is avoided. Although the groups may range from methyl up through about triacontyl, it is preferred that the alkyl groups be saturated and straight chained and have predominantly or exclusively from about 6 to about 20 carbon atoms each with little if any present of the region from methyl through pentyl so as to facilitate the separation from a water phase of a substantially insoluble organic phase of alcohols and to avoid the need for high temperatures to avoid melting point problems with high molecular weight alcohols.

Typical aluminum alkoxides used are trihexoxy aluminum, tridecoxy aluminum, tridodecoxy aluminum, tritetradecoxy aluminum as well as trihexoxy aluminum, triheptoxy aluminum, trinonoxy aluminum, triundecoxy aluminum, tridecoxy aluminum, tripentadecoxy aluminum and the like. Other suitable aluminum alkoxides those of U.S. Pat. No. 2,892,858, particularly those whose corresponding alcohols are substantially insoluble in water. Such alkoxides are readily obtained by oxidation of aluminum alkyls produced via the processes of U.S. Pat. Nos. 2,781,410 and 2,835,689.

Aluminum alkoxides used may be in the pure form in the sense that all of the alkyl groups in a given mixture have the same number of carbon atoms or they may be mixtures in regard to alkyl groups. Such mixtures may contain two or more different alkyl groups. A typical mixture of aluminum alkoxides is that produced by a chain growth operation of ethylene on a lower alkyl aluminum compound such as triethyl aluminum or tripropyl aluminum producing a wide range of aluminum alkoxides ranging from compounds with ethyl oxy groups through triacontyl oxy groups in a statistical distribution such as that of the Poisson distribution or a modified Poisson distribution produced by a peaking operation in accordance with known processes such as is described in U.S. Pat. Nos. 3,384,651 and 3,415,861. When using wide range mixtures of aluminum alkoxides such as those obtained through the chain growth operation, one may encounter instances wherein the separations of the organic and aqueous phases is accomplished easier than in other instances. Usually this is the result of the presence of absence of water-soluble alcohols in the organic constituency. If the separation is such that improvement is desired, it is generally possible to remove the lower alcohols by conventional procedures such as distillation; however, where the prior processing of the aluminum alkoxides permits control over such matters it is generally preferred to produce aluminum alkoxides having a minimum content of lower alkyl groups that result in the production of water-soluble alcohols. In general, it is preferred, therefore, to use aluminum alkoxides having no more than about 10 mol percent total ethoxy, methoxy, propoxy, butoxy, and pentoxy group content.

The carbon skeletal structures of the alkyl groups used in the aluminum alkoxides reacted in accordance with the process of the present invention are not particularly critical. Furthermore, it should be evident that the term "alkoxide" is used in a general sense to cover various compatible organo-oxy groups which do not react adversely under the conditions set forth. Although various hydrocarbyl oxy aluminum compounds known from the prior art may be used, it is generally preferred to use alkoxy aluminum compounds where the term alkyl is used in a narrow sense; viz, $C_nH_{2n+1}$ where $n = 5\text{-}30$ because of their desired reactivity and freedom from adverse reactivity.

Preferred alkyl groups in the preferred alkoxy compounds are the straight chain aliphatic groups of the formula $C_nH_{2n+1}$ ($n = 5\text{-}30$) particularly those which have terminal carbon atom attachment to the oxygen atom in the alkoxy compounds, e.g. $CH_3(CH_2)_nCH_2\text{-}O\text{-}al$ where $al = 1/3$ Al and $n = 4\text{-}28$. Other useful alkyl groups are cycloaliphatic and proximately and remotely branched alkyl groups such as those having two or more alkyl groups bonded to the carbon atom which is bonded to oxygen,

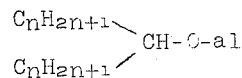

where total carbon is 6-30, as well as those wherein the carbon atom bonded to oxygen is a primary carbon atom which is bonded to a tertiary carbon atom.

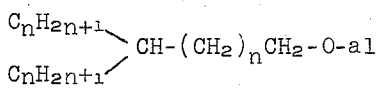

where total carbon is 6-30. It will be recognized that the former type of branched alkoxy groups is in reality a secondary alkyl structure which results in the production of secondary alcohols while the latter is a structure of the type corresponding to vinylidene olefins which result in the production of branched primary alcohols. Of course, it is to be understood that straight chain primary structures, straight chain secondary structures and the vinylidene olefin type of structures can have remote branching at carbon atoms more remote than the one attached to the oxygen or the carbon atom directly attached to the carbon atom attached to oxygen. Although it is well known that the secondary and primary branched alcohols have properties which are similar to but somewhat different from those of the straight chain normal alcohols which have attachment to the oxygen via a primary carbon atom, such different alcohols are substantially equivalent as far as the practice of the present invention is concerned because the slight temperature and melting point difference do not materially affect operation of the present process in an unpredictable manner. Other suitable structures are difunctional structures with two or more linkages to one or more aluminum molecules such as al-O-$(CH_2)_n$-O-al and

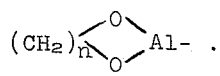

Where the aluminum chlorohydrate produced in the present process is used as an intermediate for the recycle of hydrochloric acid via pyrolysis, the aqueous solution thereof is preferably pre-dried in one or more steps and heated to an ultimate temperature in the region of from about 150° to about 1500°C, preferably from about 300° to about 1000°C, more preferably from about 450° to about 600°C under which conditions the hydrochloric acid readily splits off and is recoverable for recycle to react with additional quantities of aluminum alkoxide. Although the two stage drying operation may facilitate the removal of excess water in those instances where such is desired, normally it is not necessary to separate the recycle hydrochloric acid from the accompanying water that was present from the aluminum chlorohydrate solution because the water may be recycled with the hydrochloric acid. Particularly is this true and it is recognized that water is consumed in the hydrolyis of the aluminum alkoxides making it necessary to supply make-up water as the operation of the invention proceeds in a recycle form of operation.

The following examples indicate preferred embodiments of the present invention.

EXAMPLE I

One tenth of a mol of aluminum hexoxide equivalent to 2.7 grams of aluminum in 100 ml of toluene was reacted with 1.825 grams (0.05 mol) of HCl in 50 cc of water at room temperature (25°C). A gelatinous mass formed. The mixture was heated at 60° for 10 minutes with agitation forming a solubilized system or mixture. On settling, a two-phase system resulted.

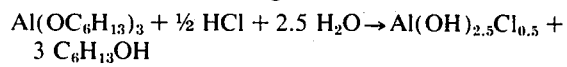

EXAMPLE II

Example I was repeated with an aluminum alkoxide containing predominantly $C_{12}$ to $C_{16}$ alkoxy groups in a ratio of about 65/25/10. The gelatinous mass initially formed was heated at 70° for 20 minutes to produce solubilization and separation of the organic and water phase.

EXAMPLE III

Example I was repeated with 0.1 mol of aluminum octoxide $Al(OC_8H_{17})_3$ and with 0.1 mol of HCl in 100 cc of water. The product was heated to 80° for 10 minutes. Good separation was obtained with the alcohol in the top layer and the aluminum in the lower layer.

EXAMPLE IV

Example III was repeated with 0.07 mol of HCl (2.5 grams) per 0.1 mol of aluminum octoxide.

EXAMPLE V

50 Grams of $Al(OH)_{2.5}Cl_{0.5}$ was heated at 400°–500°C for three hours and analyzed. It contained 44.6 percent aluminum and 1.68 percent chlorine. A sample of the same starting material was heated for 8 hours in a second experiment and the product analyzed. The product contained substantially zero chlorine present.

I claim:

1. A process for hydrolyzing aluminum alkoxides to produce alcohol and a hydroxy chloroaluminum compound which comprises:

reacting an aluminum alkoxide having from about 6 to about 30 carbon atoms per alkoxide group and hydrochloric acid in molar proportions of from about ½ to about 1 mol of hydrochloric acid per mol of aluminum alkoxide in an aqueous system to form a two phase reaction product system, one of said phases being an organic phase, the other of said phases being an aqueous solution of $AlCl_{0.5-1.0}(OH)_{2.5-2.0}$, and separating the phases.

2. The process of claim 1 wherein the aluminum alkoxide contains a plurality of alkyl groups ranging from about ethyl to about triacontyl, predominating in decyl, dodecyl, tetradecyl and hexadecyl alkyl groups.

3. The process of claim 1 wherein the aluminum alkoxide contains predominantly octyl and higher alkyl groups.

4. The process of claim 1 wherein the molar ratio of hydrochloric acid to aluminum alkoxide is about ½:1 and the product is $AlCl_{0.5}(OH)_{2.5}$.

5. The process of claim 1 wherein the temperature is from about 0 to about 150°C.

6. The process of claim 1 wherein the temperature is from about 40° to about 80°C.

7. The process of claim 1 wherein substantially anhydrous aluminum alkoxide is combined with an HCl solution of from about 1 to about 38 weight percent HCl.

8. An improved method for producing aluminum oxide or aluminum hydroxide which comprises:

reacting an aluminum alkoxide having from about 6 to about 30 carbon atoms per alkoxide group and hydrochloric acid in molar proportions of from about ½ to about 1 mol of hydrochloric acid per mol of aluminum alkoxide in an aqueous system to form a two phase reaction product system, one of said phases being an organic phase, the other of said phases being an aqueous solution of $AlCl_{0.5-1.0}(OH)_{2.5-2.0}$, separating the phases and vaporizing water and hydrochloric acid from the $AlCl_{0.5-1.0}OH_{2.5-2.0}$ to produce a residue of aluminum hydroxide or aluminum oxide.

9. The process of claim 8 wherein the hydrochloric acid vaporized is recovered and recycled to the step of reaction of the aluminum alkoxide.

10. The process of claim 8 wherein at least a portion of the heating of the $AlCl_{0.5-1.0}(OH)_{2.5-2.0}$ to produce aluminum hydroxide or aluminum oxide is at a temperature of from about 150° to about 1500°C.

11. The process of claim 8 wherein the heating of the $AlCl_{0.5-1.0}(OH)_{2.5-2.0}$ is at a temperature of from about 300° to about 1000°C.

12. The process of claim 8 wherein the heating of the $AlCl_{0.5-1.0}(OH)_{2.5-2.0}$ is at a temperature of from about 450 to about 600°C.

13. The process of claim 8 wherein the heating of the $AlCl_{0.5-1.0}(OH)_{2.5-2.0}$ is at a temperature of about 500°C.

* * * * *

UNITED STATES PATENT OFFICE
CERTIFICATE OF CORRECTION

PATENT NO. : 3,887,691
DATED : June 3, 1975
INVENTOR(S) : Paul Kobetz

It is certified that error appears in the above-identified patent and that said Letters Patent are hereby corrected as shown below:

Cover page in item [75], reads "Paul Kobetz, Baton Rouge, La.", should read -- Paul Kobetz, deceased, late of Baton Rouge, La. --. Column 2, line 31, reads "comlete", should read -- complete --. Column 3, line 25, reads "in", should read -- In --. Column 6, line 21, reads "presence of absence", should read -- presence or absence --; line 45, reads "narow", should read -- narrow --; line 46, reads "5-30", should read -- 6-30 --; line 50, reads "(n = 5-30)", should read -- (n = 6-30) --. Column 9, line 6, reads "$_oOH_{2.5-2.0}$", should read -- $_o(OH)_{2.5-2.0}$ --.

Signed and Sealed this eighteenth Day of November 1975

[SEAL]

Attest:

RUTH C. MASON
*Attesting Officer*

C. MARSHALL DANN
*Commissioner of Patents and Trademarks*